Feb. 28, 1961 V. P. STEELE 2,973,003
FLUID DISPERSION VALVE
Filed Aug. 6, 1959
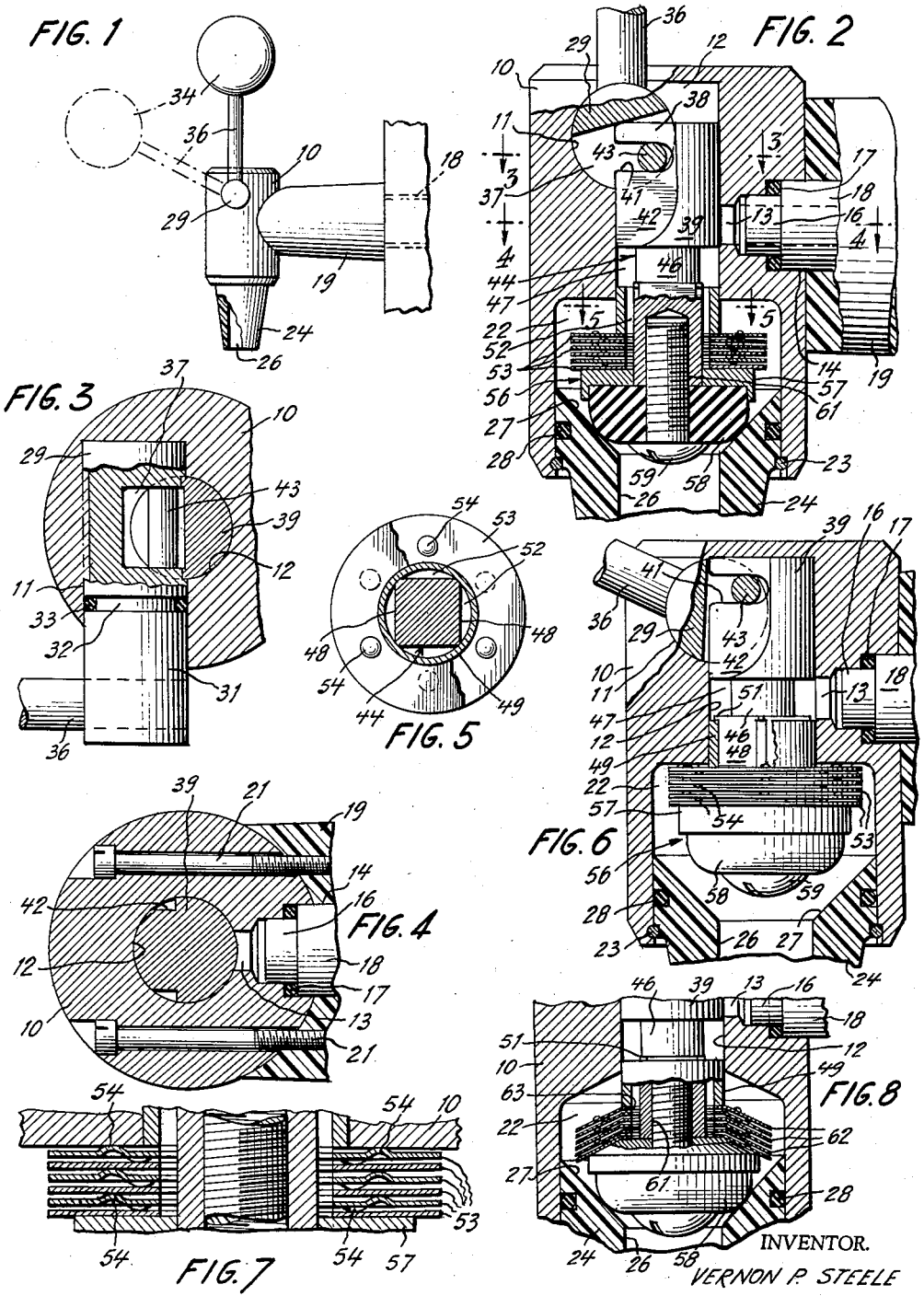
INVENTOR.
VERNON P. STEELE
BY
ATTORNEY

United States Patent Office 2,973,003
Patented Feb. 28, 1961

2,973,003

FLUID DISPERSION VALVE

Vernon P. Steele, 30 Rugby St., Stamford, Conn.

Filed Aug. 6, 1959, Ser. No. 832,116

8 Claims. (Cl. 137—170.1)

This invention relates to valves and in particular to one in which fluid dispersion means are provided.

A particular object of the invention is to provide a valve that is so constructed that a fluid, such as a carbonated beverage can be slowed down in its passage through the valve, which fluid is usually under pressure, in such a manner that the gas bubbles will not be broken to release the gas and spoil the carbonated character of the fluid.

Another object of the invention is to provide a valve structure that can be dismembered for cleaning, replacement of parts or adjustment and can be assembled with a screw driver or other blade like device, with a minimum of effort and time so that the servicing of a number of such valves in an establishment is not a time consuming and costly procedure.

Still further objects of the invention are; to provide a quick acting valve structure; to provide one that completely and positively cuts off the flow of fluid so that dripping is kept to a minimum; and to provide a valve that can be made of metal, plastic, or a combination thereof to enhance the appearance of the valve.

Other objects and structural details of the invention will be apparent from the following description, when read in conjunction with the accompanying drawing, wherein:

Figure 1 is a side view of a valve showing the operating handle in open and in closed position, Figure 2 is an enlarged vertical cross section taken through the valve body and showing the arrangement of the parts thereof in closed position, Figure 3 is a section on the line 3—3 of Figure 2 showing a cylindrical rocker member in relation to the valve cylinder, Figure 4 is a section on the line 4—4 of Figure 2 showing the assembly of some of the valve parts, Figure 5 is a section on the line 5—5 of Figure 2 showing the construction of the lower fluid passageway of the valve, Figure 6 is a view similar to Figure 2 showing the parts of the valve in open position, Figure 7 is an enlarged section taken through the fluid diffusing disks forming a feature of the valve structure, and Figure 8 is a sectional view of the lower portion of the valve illustrating a modified form of fluid diffusing means.

Referring to the drawing in detail, 10 indicates a valve, the body of which is formed to provide a laterally extending rocker bore 11 intersecting a vertical valve cylinder bore 12 intermediate the ends of the latter. Opening out of the bore 12, at the rear thereof, is an inlet 13 whose outer recessed end 14 provides a seat for the end of a fluid pipe 16 which is rendered leak proof by a seal 17, and which provides a connection between the valve and a fluid feed pipe 18 as shown in Fig. 1, and passes through a suitable mounting sleeve 19 to which is secured, as by screws 21 or other fastening means, as shown in Figure 4, to the valve 10.

The lower end of the valve bore 12 opens into an enlarged cavity which is designated as a fluid dispersion chamber 22, the edge wall of which is angularly grooved to provide a seat for a snap ring 23 which fits into a shoulder groove in the upper end of a detachable discharge nozzle 24. The latter may be of plastic or other material and be tapered on its exterior and have a central discharge opening 26 thereon which terminates at its upper end in an outwardly flared sealing seat 27. The outer surface of the upper end of the nozzle 24 is provided with a sealing ring or gasket 28 which provides a friction holding means to yieldably resist an inward movement of the nozzle when the latter is to be removed as will be later explained.

The lateral rocker bore 11 is arranged to receive a valve rocker or actuator 29 which is pushed into the bore 11 from one side of the valve 10 and consists of a cylindrical body piece 31, having an annular groove 32 for holding a sealing ring 33, having close sliding fit in the bore 11, the sealing ring 33 also providing a frictional resistance to a too free turning movement of the handle 34, which may be of any desired shape and secured to the rocker cylinder 29 by a rod 36. The rocker 29 in that portion in alignment with the cylinder bore 12 is recessed as at 37 to receive the cylindrical upper portion 38 of a valve head 39, laterally slotted as at 41, the opposite sides of which slotted area are cut out to provide flat side faces 42 which fit snugly into the recess 37 so that a rocker pin 43 extending across the outer reach of the recess 37 can seat in the slot 41 with a minimum of lost motion. The relation between the center of the valve bore 12 and the radial position of the rocker pin 43 is such that, when the handle is thrown rightward from the full line position shown in Figure 1, the pin 43 will be lowered out of alignment with the bore 12 and the valve assembly can be inserted in bore 12 so that the slot 41 can be positioned for receiving the pin 43 when the handle 34 is manipulated to the full line position of Figure 1, and as shown in section in Figure 2. In the latter position the valve is in lower or closed position, while in Figure 6 the valve is in raised or open position.

The valve is of novel structure in that it provides restricted passages that slow up the flow of the fluid without breaking up the bubble formation. The valve cylinder or head 39 is the upper end of an integral stem member 44 whose reduced diameter at 46 provides a fluid passage 47 aligned with inlet 13 when the valve is open. The lower part of the stem 44 is squared as at 48 with the corners bevelled or rounded to fit closely within a spacing sleeve 49 which at its upper edge abuts small overhanging shoulders 51 formed at the upper ends of the bevelled corners of the squared section 48. The spaces 52 between the flat faces 42 constitute fluid passages leading from passage 47 to a series of baffle disks 53 each having dimples 54 for the purpose of spacing the disks from each other to form fluid dispersing means which further impede the flow of the fluid under pressure without breaking the gas bubbles thereof. While the flow is referred to, the action is that of reducing the pressure of the flow so that as the fluid goes into a receptacle the gas is not appreciably released.

The disks 53 each have a central circular opening of the same diameter as the distance across the squared portion of the stem at the bevelled edges thereof so that the fluid leaving the passages 52 flow out between the disks 53. It will be noted in Figure 2 that the disks fit over and are supported on the lower end of the squared portion 48 of the stem 44 and are fixed in this position by a valve seat member 56.

The valve seat member 56 consists of a metal washer 57 to which is fixed a seat piece 58 of rubber or other suitable composition and through which extends a screw 59 for threaded engagement with a threaded bore 61 in the lower end of the stem 44. The seat piece is suitably rounded or bevelled to provide a seal for the valve when it is in engagement with the flared wall 27 or sealing seat in the upper end of the spout or discharge nozzle 24.

The disks provide a cushioning function for the valve in opening action as they may abut the top of the accumulating chamber 22, and this may be closely controlled by adjustment of the parts, if desired. Also, in order to eliminate whistle encountered in this type of valve, I make the valve head with a slight sliding clearance so that the fluid can seep into the chamber 22 when the valve is in the closed position of Figure 2, the chamber 22 thus being full of fluid when the tap is opened and this will eliminate the objectionable air whistle.

In Figure 8 I have modified the showing of the disks wherein the disks 62 are dished in cross sectional shape and are piled in inverted position to produce downwardly directed annular fluid dispersion passages. The flat central portion 63 of each disk has an opening that slides over the bevelled corners of the squared portion 48 of the stem 44. These disks in their flared portions are also provided with dimples to hold the disks in spaced relation.

When it is desired to take the valve apart, the ring 23 is snapped out of the bottom of the valve 10 after the nozzle is pushed in slightly. Then the nozzle is removed and the handle is moved slightly to the right from the Figure 1 position to free the pin 43 from the slot 41 to let the valve stem assembly drop out. In this way the valve can be kept in a sanitary condition, is easy to dismantle and assemble. It should be noted in the last operation that when the handle is moved to the right position, as above explained, the end of the wall forming the recess in the rocker 29 will act as a limit stop, when the valve assembly is pushed in, to position the slot 41 thereof in position to receive the pin 43 when the handle is moved toward the left in Figure 1 from the rightward position as above set forth.

While I have shown and described what I consider to be the best embodiment of my invention, it is obvious that changes in form could be made without departing from the spirit of the invention, and I therefore do not limit myself to the exact form herein shown and described nor to anything less than the whole of my invention as hereinbefore set forth and as hereinafter claimed.

It will be noted that the top head 39 will close off inlet 13 precisely ahead of the seat piece 58 bearing on seat 58 and vice versa so that this double action provides a smooth fluid flow without water hammer or other objectionable noises or knocking.

What I claim is:

1. A dispensing valve for carbonated fluids including, in combination, a valve body constituting a housing having a plurality of bores including inlet and valve bores, a fluid passage and a fluid dispersion chamber, the valve bore providing said fluid passage, said bore extending longitudinally of said valve body and opening at its lower end into the fluid dispersion chamber, said inlet bore opening into the valve bore at one side thereof and at a place therein constituting said fluid passage, a valve assembly slidable in the fluid passage and extending into said dispersion chamber, said valve assembly including a head for opening and closing said inlet bore, a stem on said head having a squared portion and a cylindrical portion each providing fluid passages connecting the inlet with said chamber, a cylindrical sleeve disposed in said valve bore and on said squared portion and defining fluid passages along and between the flat faces of said squared portion and the inner wall of said sleeve, a plurality of fluid dispersing disks each having a circular opening fitting over the squared portion at the end of the sleeve to define fluid passages between the flat faces of said squared portion and the circular edges of said disks, the disks providing fluid passages therebetween leading from said flat faces to said fluid dispersion chamber, outlet means opposite the bore end of the dispersion chamber, and valve seat means connected to and abutting the lower squared end of said valve stem and for sealing said outlet means and supporting said disks on said squared portion, said disks being held between the valve seat means and the lower edge of said sleeve.

2. A valve of the character set forth in claim 1, in which protuberances are formed on the disks to provide for separation of the same in stacked formation.

3. A valve of the character set forth in claim 1, in which protuberances are formed on the disks to provide for separation of the latter in stacked formation, and said disks being of inverted dish shape.

4. A valve of the character set forth in claim 1, in which said valve seat means includes a washer member abutting said dispersion disks, a seat member on said washer and means for securing the seat and washer members on the end of said stem.

5. A valve of the character set forth in claim 1 in which said fluid passage, the spaces between the inner walls of the disks and the flat faces of the squared portion of the valve stem constitute a series of water passages of diminishing extent for gradually retarding the flow of the liquid without releasing a charge therefrom.

6. A valve of the character set forth in claim 1, including a discharge nozzle for the valve housing shaped to provide a valve seat, and means for detachably holding said nozzle in the exit end of said housing for removal of said valve assembly from said housing.

7. A valve of the character set forth in claim 1 including a slot in the head of said valve, and valve operating means movable out of said slot and out of said bore for removal of the valve from said valve housing.

8. A valve of the character set forth in claim 1 wherein said valve head has a slight sliding clearance with the wall of the valve bore whereby fluid can seep into the fluid dispersion chamber when the valve is closed.

References Cited in the file of this patent

UNITED STATES PATENTS

| | | |
|---|---|---|
| 1,747,598 | Popp | Feb. 18, 1930 |
| 2,233,236 | Zinkil | Feb. 25, 1941 |
| 2,277,275 | Swartz | Mar. 24, 1942 |
| 2,537,798 | Smith | Jan. 9, 1951 |
| 2,907,547 | Gore | Oct. 6, 1959 |